(12) United States Patent
Hedblom

(10) Patent No.: US 10,753,053 B2
(45) Date of Patent: Aug. 25, 2020

(54) PAVEMENT MARKING COMPOSITION

(75) Inventor: Thomas P. Hedblom, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 385 days.

(21) Appl. No.: 13/990,292

(22) PCT Filed: Nov. 21, 2011

(86) PCT No.: PCT/US2011/061616
§ 371 (c)(1),
(2), (4) Date: Sep. 25, 2013

(87) PCT Pub. No.: WO2012/074810
PCT Pub. Date: Jun. 7, 2012

(65) Prior Publication Data
US 2014/0011911 A1  Jan. 9, 2014

Related U.S. Application Data

(60) Provisional application No. 61/417,960, filed on Nov. 30, 2010.

(51) Int. Cl.
*E01F 9/506* (2016.01)
*C09D 121/00* (2006.01)
*C08L 23/08* (2006.01)

(52) U.S. Cl.
CPC ............ *E01F 9/506* (2016.02); *C09D 121/00* (2013.01); *C08L 23/0869* (2013.01)

(58) Field of Classification Search
None
See application file for complete search history.

(56) References Cited

U.S. PATENT DOCUMENTS

| | | | |
|---|---|---|---|
| 4,282,281 A | 8/1981 | Ethen | |
| 4,490,432 A | 12/1984 | Jordan | |
| 4,753,976 A * | 6/1988 | Yoshioka | C08G 77/28 524/575.5 |
| 4,988,541 A | 1/1991 | Hedblom | |
| 5,053,253 A * | 10/1991 | Haenggi | C04B 26/16 427/136 |
| 5,094,902 A * | 3/1992 | Haenggi | C04B 26/16 428/149 |
| 5,127,973 A * | 7/1992 | Sengupta | B32B 27/40 156/60 |
| 5,194,113 A | 3/1993 | Lasch | |
| 6,326,053 B1 * | 12/2001 | Stump et al. | 427/163.4 |
| 6,533,870 B1 * | 3/2003 | Granstrom | E01C 23/081 134/16 |
| 6,630,531 B1 | 10/2003 | Khandpur | |
| 6,861,141 B2 | 3/2005 | Buccellato | |
| 7,169,831 B2 | 1/2007 | Helland | |
| 2002/0155276 A1 | 10/2002 | Owusu | |
| 2003/0069358 A1 * | 4/2003 | Helland | C08K 7/08 525/165 |
| 2003/0123930 A1 * | 7/2003 | Jacobs | E01F 9/512 404/12 |
| 2003/0211308 A1 | 11/2003 | Khandpur | |
| 2005/0282933 A1 | 12/2005 | Patel | |
| 2006/0111468 A1 | 5/2006 | Helland | |
| 2009/0286049 A1 * | 11/2009 | McFarland | B41J 11/002 428/195.1 |

FOREIGN PATENT DOCUMENTS

| | | | |
|---|---|---|---|
| EP | 0 488 526 | 10/1991 | |
| EP | 0601790 A1 * | 6/1994 | B32B 25/14 |
| WO | WO 96/41844 | 12/1996 | |
| WO | WO-0142349 A1 * | 6/2001 | C08K 9/08 |
| WO | WO 03/027396 | 4/2003 | |

OTHER PUBLICATIONS

Seyler, Assignment of the Glass Transition, ASTM STP 1249, ASTM publication code No. 04-012490-50, Printed Sep. 1994.*
Wypych, George. (2010). Handbook of Fillers (3rd Edition)—2.1.33 Glass Beads. ChemTec Publishing. Retrieved from https://app.knovel.com/hotlink/pdf/id:kt007C15M1/handbook-fillers-3rd/glass-beads (Year: 2010).*
International Search Report for International Publication No. PCT/US11/61616, dated May 23, 2012.
Extended European Search Report for European Patent Application No. 11 84 5683.9 dated Dec. 1, 2014.
Extended European Search Report for European Patent Application No. 11 84 5683.9, dated Apr. 20, 2015.

\* cited by examiner

*Primary Examiner* — Nicole M. Buie-Hatcher

(57) ABSTRACT

Desired combinations of physical properties can be achieved with a pavement marking composition including non-cross-linked elastomeric materials dispersed within a polymeric material. Notably, the pavement marking composition does not include any reinforcing materials, such as, for example, ceramic fibers, asbestos, silicon dioxide, and/or talc. Despite the lack of reinforcing materials, the pavement marking composition has good tensile strength in both the downweb and crossweb directions.

12 Claims, No Drawings

PAVEMENT MARKING COMPOSITION

TECHNICAL FIELD

This disclosure generally relates to a pavement marking composition. In some embodiments, the pavement marking composition is formed into a sheet material such as a tape.

BACKGROUND

Pavement marking tapes are typically used to delineate traffic lane boundaries on a roadway. Pavement marking tapes may extend continuously, such as, for example, along the outermost boundaries of the driving lanes, or intermittently, such as, for example, between lanes. One exemplary use for pavement marking tapes is in construction work zones, where pavement marking tapes help guide motorists through new traffic patterns without incident. In such instances, these pavement marking tapes are typically removed from the roadway after the construction is complete. To permit removal of the pavement marking tape from the roadway surface in a single piece, the pavement marking tape preferably has sufficient structural integrity to prevent tearing. In instances where the pavement marking tape is intended to remain in place indefinitely, it is necessary to provide structural integrity sufficient to withstand the abuse that weather and vehicles driving over the pavement marking tape impose. One major failure mode of patterned pavement markings is flattening. For wet reflective patterned pavement markings, flattening of the raised pattern can greatly decrease performance.

SUMMARY

Flattening of patterned pavement markings is a function of, for example, the number of traffic hits, the surface temperature of the roadway, and special installation parameters (i.e., inlaid into hot asphalt). Traditional calendered pavement marking compositions exhibit physical property differences along their different axes. Commercially available pavement marking compositions have higher (in some cases, much higher) tensile and yield properties in the manufacturing direction (referred to as the downweb (DW) direction) as compared to the direction perpendicular to the manufacturing direction (referred to as the crossweb, (CW) direction). A correlation has been shown between pavement marking pattern retention and crossweb material properties, especially yield stress and 10% modulus at high temperatures (70° C., which is typical of asphalt inlay and summertime road surface temperature). Ideal pavement marking compositions have at least some of the following characteristics. One such characteristic is a high yield stress at high temperatures while maintaining adequate flexibility at low temperatures to ensure good roadway adhesion. These material properties seem contradictory and have thus far proved difficult if not impossible to achieve. However, the inventors of the present application have discovered a pavement marking composition that achieves these competing goals.

It has also been discovered that pavement marking tapes having a greater tensile strength in one direction (e.g., downweb) versus the other direction (e.g., crossweb) tend to result in reduced conformability and sheer resistance. In some instances, this differential tensile strength can result in the pavement marking tape breaking away from the pavement to which it was applied. Accordingly, industry would find advantage in pavement marking compositions, tapes, and sheet materials that comprise a composition having similar downweb and crossweb tensile strength. One prior art attempt to form such a pavement marking composition include, for example, U.S. Pat. No. 7,169,831, which describes a pavement marking composition having similar downweb and crossweb tensile strength. The pavement marking composition included a non-crosslinked elastomer made of ceramic fibers dispersed within a polymeric material. Another prior art attempt to form such a pavement marking composition is described in U.S. Pat. No. 5,194,113, which describes a thermoplastic (polyolefin) pavement marking composition including nonreinforcing mineral particulates.

The inventors of the present application discovered that the desired combination of physical properties can be achieved with a pavement marking composition including non-crosslinked elastomeric materials dispersed within a polymeric material. Notably, the pavement marking composition does not include any reinforcing materials, such as, for example, ceramic fibers, asbestos, silicon dioxide, and/or talc. Despite the lack of reinforcing materials, the pavement marking composition has good tensile strength in both the downweb and crossweb directions. Also, pavement marking composition Tg is less than −10° C. Also, in at least some embodiments, the pavement marking composition demonstrates improved resistance to flattening at high temperature and/or increased flexibility at low temperature.

One embodiment of the present application is a pavement marking composition, comprising: a non-crosslinked elastomeric material; wherein the pavement marking composition lacks a reinforcing material.

Another embodiment of the present application is a pavement marking composition, comprising: a non-crosslinked elastomeric material; wherein the pavement marking composition has a downweb/crossweb tensile strength ratio that is less than 150 percent at 25° C.

Another embodiment of the present application is a pavement marking composition, comprising: a non-crosslinked elastomeric material; and wherein the pavement marking composition has a Tg that is less than −10° C.

Another embodiment of the present application is a pavement marking composition, comprising: a non-crosslinked elastomeric material; wherein the pavement marking composition has a downweb/crossweb 10% secant modulus ratio less than 150 percent.

Another embodiment of the present application is a pavement marking composition, comprising: a non-crosslinked elastomeric material; wherein the pavement marking composition has a crossweb 10% secant modulus greater than 30 kg/cm$^2$ at 70° C.

Another embodiment of the present application is a pavement marking composition, comprising: a non-crosslinked elastomeric material; wherein the pavement marking composition has a crossweb tensile strength that is greater than 3.5 kg/cm$^2$ at 70° C.

The pavement markers and pavement marking compositions of the present disclosure have various performance or physical attributes. For example, in some embodiments, the pavement marking composition and/or pavement markers have a downweb/crossweb tensile strength ratio that is less than 150 percent at 25° C. In some embodiments, the pavement marking composition and/or pavement markers have a Tg that is less than −10° C. In some embodiments, the pavement marking composition and/or pavement markers have a downweb/crossweb 10% secant modulus ratio less than 150 percent. In some embodiments, the pavement marking composition and/or pavement markers have a crossweb 10% secant modulus that is greater than 30 kg/cm$^2$ at 70° C. In some embodiments, the pavement marking composition and/or pavement markers have a crossweb 10% secant modulus that is less than 400 kg/cm² at 0° C. In some embodiments, the pavement marking composition and/or pavement markers have a crossweb tensile strength that is greater than 3.5 kg/cm² at 70° C. In some embodiments, the pavement marking composition and/or pavement markers have a crossweb tensile strength that is less than 50 kg/cm² at 0° C. In some embodiments, the pavement marking composition and/or pavement markers have a downweb/crossweb 10% secant modulus ratio at 25° C. that is less than 150 percent. In some embodiments, the pavement marking composition and/or pavement markers have a downweb 10% secant modulus that is less than 300 kg/cm² at 25° C.

The pavement markers of the present disclosure can be any desired color, including, for example, white or yellow. The pavement markers can be colored in any way known in the art, including, for example, inclusion of one or more of $TiO_2$ and $CaCO_3$. The pavement markers of the present application can also include an ultramarine blue pigment that increases whiteness.

DETAILED DESCRIPTION

The pavement marking compositions of the present application include a non-crosslinked elastomeric material. Exemplary non-crosslinked elastomeric materials include, for example, acrylonitrile-butadiene polymers, neoprene, polyacrylates, natural rubber, and styrene-butadiene polymers. In some embodiments, acrylonitrile-butadiene polymers are especially desirable elastomer precursors because they offer a high degree of oil resistance. The pavement marking compositions of the present disclosure generally include at least 5 weight percent (wt %) non-crosslinked elastomeric material and no more than about 25 wt % non-crosslinked elastomeric material. An exemplary preferred range is between about 5 wt % and about 15 wt %. The polymeric material provides a viscoelastic character, which permits absorption of the forces and pressures of wheeled road traffic without creating internal forces that tend to remove the marking from the roadway. In some embodiments, PVC (e.g., PVC resin) is used to plasticize the elastomeric material.

The pavement marking composition of the present disclosure also includes thermoplastic reinforcing polymers, of the type generally described in, for example, U.S. Pat. No. 4,490,432. Thermoplastic reinforcing polymers generally comprise from about 1 to about 25 wt % of the total composition. An exemplary preferred range is between about 1 wt % and about 5 wt %.

The pavement marking composition may optionally comprises up to about 75 weight-% of other ingredients selected from reflective elements (e.g., glass beads), extender resins, fillers, and pigment. The proportions can be varied within the stated ranges depending upon the amount of other ingredients included in the composition, especially the amount and kind of optional fillers.

Extender resins, often halogenated polymers such as chlorinated paraffins, but also hydrocarbon resins or polystyrenes, are preferably included with the non-crosslinked elastomer precursor ingredients, and are miscible with, or form a single phase with, the elastomer precursor ingredients.

In some embodiments, the non-cross-linked elastomeric materials are admixed with the additional materials forming a relatively homogeneous mixture, wherein the non-cross-linked elastomeric materials are dispersed randomly three-dimensionally throughout the polymeric material. A high shear mixer is suitable for this purpose. Alternatively, in forming a sheet the non-crosslinked elastomeric materials may be deposited in a substantially planar orientation.

After mixing, the composition is processed on calendering rolls where the composition forms a smooth band and are processed into thin sheets of the desired thickness. Generally sheets are formed having a thickness of at least about ¼ millimeter, and preferably at least about 1 millimeter, but generally the sheets are less than about 5 millimeters thick, and preferably less than 3 millimeters thick. The sheet may be embossed as described in U.S. Pat. No. 4,988,541.

The pavement markers of the present disclosure can be any desired color, including, for example, white or yellow. The pavement markers can be colored in any way known in the art, including, for example, inclusion of one or more of $TiO_2$ and $CaCO_3$. The pavement markers of the present application can also include an ultramarine blue pigment that increases whiteness.

The pavement markers and pavement marking composition of the present disclosure have various performance or physical attributes. For example, in some embodiments, the pavement marking composition and/or pavement markers have a downweb/crossweb tensile strength ratio that is less than 150 percent at 25° C. In some embodiments, the pavement marking composition and/or pavement markers have a Tg that is less than −10° C. In some embodiments, the pavement marking composition and/or pavement markers have a downweb/crossweb 10% secant modulus ratio less than 150 percent. In some embodiments, the pavement marking composition and/or pavement markers have a crossweb 10% secant modulus that is greater than 30 kg/cm² at 70° C. In some embodiments, the pavement marking composition and/or pavement markers have a crossweb 10% secant modulus that is less than 400 kg/cm² at 0° C. In some embodiments, the pavement marking composition and/or pavement markers have a crossweb tensile strength that is greater than 3.5 kg/cm² at 70° C. In some embodiments, the pavement marking composition and/or pavement markers have a crossweb tensile strength that is less than 50 kg/cm² at 0° C. In some embodiments, the pavement marking composition and/or pavement markers have a downweb/crossweb 10% secant modulus ratio at 25° C. that is less than 150 percent. In some embodiments, the pavement marking composition and/or pavement markers have a downweb 10% secant modulus that is less than 300 kg/cm² at 25° C.

Retroreflective elements (e.g., transparent microspheres, cube-corner particles derived from ground sheeting) or and skid-resisting particles (e.g., sand particles) are also preferably included in the sheet material of the invention at concentration up to about 60 wt % to provide reflectivity at night and to give the sheet material skid-resisting qualities. Preferably, about 35 wt % to about 50 wt % reflective glass beads are dispersed throughout the thickness of the pavement marking sheet. An exterior layer of such particles may be provided on the top of the sheet material, partially embedded in the sheet material and partially protruding from the sheet material, to provide immediate reflectivity and skid-resistance; and other particles may be embedded in the sheet material to become exposed as the sheet material is worn away. The particles may be held in the partially protruding position by use of a support film adhered to the sheet material of the invention, for example, as taught in column 4 of U.S. Pat. No. 4,988,541.

Alternatively, retroreflective properties may be provided by bonding retroreflective sheeting on the exposed surface of the pavement marking. The two most common types of retroreflective sheeting are microsphere-based sheeting and cube corner-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). "Enclosed-lens" based sheeting refers to retroreflective sheeting in which the beads are in spaced relationship to the reflector but in full contact (i.e., covered) with resin. The "encapsulated lens" retroreflective sheeting is designed such that the reflector is in direct contact with the bead but the opposite side of the bead is in a gas interface.

The pavement marking sheet or tape typically includes a pressure sensitive adhesive for bonding the sheet to a roadway surface. Suitable adhesive compositions may comprises a wide variety of non-thermoplastic hydrocarbon elastomers including, natural rubber, butyl rubber, synthetic polyisoprene, ethylene-propylene rubber, ethylene-propylene-diene monomer rubber (EPDM), polybutadiene, polyisobutylene, poly(alpha-olefin) and styrene-butadiene random copolymer rubber. These elastomers are distinguished from thermoplastic elastomers of the block copolymer type such as styrenic-diene block copolymers which have glassy end blocks joined to an intermediate rubbery block. Such elastomers are combined with tackifiers as well as other optional adjuvants. Examples of useful tackifiers include rosin and rosin derivatives, hydrocarbon tackifier resins, aromatic hydrocarbon resins, aliphatic hydrocarbon resins, terpene resins, etc. Typically the tackifier comprises from 10 to 200 parts by weight per 100 parts by weight of the elastomer. Other preferred adhesive compositions include acrylate based pressure sensitive adhesive compositions. Preferred acrylate based adhesive compositions include four types of compositions, namely i) compositions comprising about 50 to 70 weight-% polyoctene and about 30 to 40 wt-% tackifier; ii) compositions comprising about 60 to 85 wt-% isooctyl acrylate, about 3 to 20 wt-% isobornyl acrylate, about 0.1 to 3 wt-% acrylic acid and about 10 to 25 wt-% tackifier; iii) compositions comprising about 40 to 60 wt-% polybutadiene and about 40 to 60 wt-% tackifier; and iv) compositions comprising 40 to 60 wt-% natural rubber and about 40 to 60 wt-% tackifier.

The sheet comprising the non-crosslinked elastomeric polymeric material in combination with other optional ingredients preferably exhibits certain properties. For example, the absolute value of the ratio of the downweb tensile to crossweb tensile of the sheet is preferably less than about 3 and more preferably less than about 2.5. The absolute value of the ratio of the downweb elongation to crossweb elongation of the sheet is preferably less than about 5 and more preferably less than about 3.

One advantage of the present disclosure is that fewer raw materials are required. Thus, manufacturing cost is lowered. In some embodiments, only seven raw materials are used whereas all prior art attempts included at least thirteen raw materials. Another advantage of the present disclosure is that use of asbestos and other fillers can represent health and human safety risks. Thus, pavement marking compositions lacking these elements can provide increased health and human safety. The pavement marking materials of the present application may also exhibit, for example, increased whiteness and/or brightness and improved material handling.

Advantages and embodiments of this disclosure are further illustrated by the following examples, but the particular materials and amounts thereof recited in these examples, as well as other conditions and details, should not be construed to unduly limit this application. In these examples, all percentages, proportions and ratios are by weight unless otherwise indicated.

EXAMPLES

The following materials were used in Comparative Examples A-C, and Examples 6.

"NIPOL 1022": copolymer of butadiene and acrylonitrile with 33% acrylonitrile and density of 0.98 g/cm$^3$, obtained from Zeon Chemicals, Louisville, Ky.

"NIPOL 1072": copolymer of butadiene and acrylonitrile with 27% acrylonitrile and density of 0.98 g/cm$^3$, obtained from Zeon Chemicals.

"POLYESTER FIBERS 3.0 DPF X ¼": polyester fibers having a density of 1.38 g/cm$^3$, obtained from Minifibers Inc., Johnson City, Tenn.

"NUCREL 699": copolymer of ethylene and methacrylic acid, nominally 11% methacrylic acid, with a density of 0.94 g/cm$^3$, obtained from DuPont, Wilmington, Del.

"SHORT STUFF E380F": polyethylene sheets having a density of 0.93 g/cm$^3$, obtained from Minifibers, Johnson City, Tenn.

"CHLOREZ 700-S": chlorinated paraffin with a 71.5% chlorine content and density of 1.60 g/cm$^3$, obtained from Dover Chemical, Dover, Ohio.

"OXYVINYL 240F": polyvinyl chloride (PVC) polymer with a relative viscosity of 2.37 and density of 1.40 g/cm$^3$, obtained from Oxy Occidental Petroleum Corporation, Los Angeles, Calif.

"KAOWOOL HA": ceramic fibers having a density of 2.60 g/cm$^3$, obtained from Thermal Ceramics, Augusta, Ga.

"EMERSOL 132 NF STEARIC ACID": stearic acid having a density of 0.88 g/cm$^3$, obtained from Emery Oleochemicals, Cincinnati, Ohio.

"LOWINOX TBM6": anti oxidant with a density of 1.09 g/cm$^3$, obtained from Chemtura Corporation, Middlebury, Conn.

"VANSTAY SC": liquid phosphate (trisooctyl phosphate (TIOP)) having a density of 0.89 g/cm$^3$, obtained from R. T. Vanderbilt Company, Norwalk, Conn.

"PAROIL 140": liquid chlorinated paraffin having a density of 1.18 g/cm$^3$, obtained from Dover Chemical.

"Ultramarine Blue-5016": blue pigment having a density of 2.30 g/cm$^3$, obtained from Mineral and Pigment Solutions Inc., South Plainfield, N.J.

"ATOMITE": calcium carbonate having a density of 2.71 g/cm$^3$, obtained from Imerys USA Inc, Roswell, Ga.

"KRONOS TITANIUM DIOXIDE": titanium dioxide (TiO$_2$) with a density of 3.90 g/cm$^3$, obtained from Kronos Inc., Houston, Tex.

"Hi-Sil 233": amorphous silicon dioxide having a density of 1.95 g/cm$^3$, obtained from PPG Industries, Pittsburgh, Pa.

"TALC MIST SUP FROST": talc with a density of 2.75 g/cm$^3$, obtained from Luzenac America Inc., Greenwood Village, Colo.

"GLASS BEADS 70-170 MESH, 1.5 Index": glass beads with a density of 2.50 g/cm$^3$, obtained from Potters Industries Inc., Valley Forge, Pa.

"YT 808D": yellow pigment obtained from Clariant International, Muttenz, Switzerland.

"YT 800D": yellow pigment obtained from Clariant International.

Indicated results were obtained using the following test methods:

Density: The density of each composition was calculated using the weight percent and density of each ingredient. Specifically, it was calculated by dividing the sum of the weight percent of all ingredients by each ingredient's specific gravity.

Glass transition temperature: A differential scanning calorimeter (model DSC7 manufactured by Perkin Elmer, Norwalk Conn.), was used to determine the glass transition temperature of Comparative Examples 1 and 2, and Examples 3 through 7. The Tg was measured by cooling the samples to about −50C, then heating at 10 C/min. The glass transition temperature is determined looking at the inflection point of the heat capacity for the composition. Tg can also be calculated using the Fox Equation.

Color Measurements: A Hunterlab Labscan 2 colorimeter (available from Hunter Associates Laboratory, Reston, Va.) was used to measure color. The procedure outlined in ASTM D6628-03, "Standard Specification for Color of Pavement Marking Materials", was used to measure the Cap Y and chromaticity of the yellow materials.

Accelerated Weathering: Specimens were exposed in accordance with ASTM G151 and ASTM G155 using a rotating rack xenon arc weathering device under conditions similar to ASTM C1442-06 Section 7.2 Procedure for Exposure in Xenon Arc Light. Samples were removed from the device after a total radiant exposure measured about 4.7 MJ/m2 between 300-400 nm.

Tensile strength at break: Samples of premix compositions 2.54 cm wide and about 1.4 mm thick were mounted on a tensile strength testing equipment (model "MTS-810" obtained from MTS Systems Corporation Eden Prairie, Minn.). Tensile strength at break was measured at temperatures of 0° C., 25° C. and 70° C. crossweb (i.e., transversal) directions, following the procedure generally outlined in ASTM D882-10 "Standard Test Method for Tensile Properties of Thin Plastic Sheeting", and using a separation speed of 24.4 cm/min. Tensile strength at break was measure in the downweb (i.e., longitudinal) direction at 25° C.

Tensile yield strength: Samples of premix compositions 2.54 cm wide and 1.4 mm thick were mounted on the tensile strength testing. Yield stress was measured at temperatures of 0° C., 25° C. and 70° C. in the crossweb direction, following the procedure outlined in ASTM D882 and using a separation speed of 24.4 cm/min.

Secant modulus of elasticity at 10% strain: Samples of premix compositions 2.54 cm wide and 1.4 mm thick were mounted on the tensile strength testing. Stress and elongation were measured at 0° C., 25° C. and 70° C. in the crossweb direction, following the procedure outlined in ASTM D882-10 and using a separation speed of 24.4 cm/min.

COMPARATIVE EXAMPLES A-C

Premix composition of Comparative Examples A, B and C, in parts per hundred rubber (pphr) is shown in Table 1, below. Mixtures were prepared as described in U.S. Pat. No. 4,490,432 (Jordan), incorporated herein by reference. Comparative Example B is described in U.S. Pat. No. 7,169,831. The ingredients listed in Table 1 were mixed in the order shown in an internal mixer, such as Banbury mixer. Ingredients listed in mix order A were charged to the internal mixer and mixed for about 3 minutes. The mixer was stopped and ingredients in mix order B were then added and mixed for about 3 more minutes. This step was repeated for ingredients in mix order C. The mixtures reached a temperature of approximately 130° C.

TABLE 1

Composition of Comparative Examples A, B and C.

| Raw Materials | Mix Order | Comp. Premix Ex. A (pphr) | Comp. Premix Ex. B (pphr) | Comp. Premix Ex. C (pphr) |
| --- | --- | --- | --- | --- |
| NIPOL 1022 | A | 100 | 100 | 100 |
| NIPOL 1072 | A | 0 | 0 | |
| POLYESTER FIBER | A | 10 | 5.0 | 10 |
| NUCREL 699 | A | 0 | 0 | 0 |
| SHORT STUFF E380F | A | 20 | 0 | 20 |
| CHLOREZ 700-S | A | 70 | 70 | 70 |
| OXYVINYL 240F | A | 0 | 0 | 0 |
| KAOWOOL HA | B | 0 | 76 | |
| STEARIC ACID | B | 0 | 1.0 | 1.0 |
| LOWINOX | B | 2.0 | 2.0 | 1.0 |
| VANSTAY SC | B | 0.5 | 0.5 | 0.5 |
| PAROIL 140 | B | 5.0 | 5.0 | 5.0 |
| Ultramarine Blue-16 | B | 0.5 | 0.5 | 0 |
| ATOMITE | B | 44 | 45 | 0 |
| TiO$_2$ | B | 65 | 65 | 7.0 |
| Hi-Sil 233 | B | 20 | 20 | 20 |
| TALC MIST SUP FROST | C | 100 | 100 | 100 |
| GLASS BEADS | C | 281 | 280.1 | 280 |
| YELLOW YT 808D | B | 0 | 0 | 12.3 |
| YELLOW YT 800D | B | 0 | 0 | 35.8 |

EXAMPLES 1-6

Premix compositions of Examples 1-6 were prepared as described in Comparative Examples A-C above and are shown in Table 2.

TABLE 2

Composition of Examples 1-6.

| Raw Materials | Mix Order | Premix Ex. 1 (pphr) | Premix Ex. 2 (pphr) | Premix Ex. 3 (pphr) | Premix Ex. 4 (pphr) | Premix Ex. 5 (pphr) | Premix Ex. 6 (pphr) |
| --- | --- | --- | --- | --- | --- | --- | --- |
| NIPOL 1022 | A | 100 | 50 | 50 | 50 | 100 | 73.2 |
| NIPOL 1072 | A | 0 | 50 | 50 | 50 | 0 | 26.8 |
| POLYESTER FIBER | A | 0 | 0 | 0 | 0 | 0 | 0 |
| NUCREL 699 | A | 28 | 28 | 28 | 28 | 28 | 19.5 |
| SHORT STUFF E380F | A | 0 | 0 | 0 | 0 | 0 | 0 |
| CHLOREZ 700-S | A | 0 | 0 | 0 | 0 | 0 | 0 |
| OXYVINYL 240F | A | 17.5 | 17.5 | 17.5 | 17.5 | 17.5 | 27.6 |
| KAOWOOL HA | B | 0 | 0 | 0 | 0 | 0 | 0 |
| STEARIC ACID | B | 1.0 | 0.8 | 0.83 | 0.83 | 0.83 | .83 |
| LOWINOX | B | 2.2 | 2.2 | 2.2 | 2.2 | 2.2 | 2.2 |
| VANSTAY SC | B | 0 | 0 | 0 | 0 | 0 | 0 |

TABLE 2-continued

Composition of Examples 1-6.

| Raw Materials | Mix Order | Premix Ex. 1 (pphr) | Premix Ex. 2 (pphr) | Premix Ex. 3 (pphr) | Premix Ex. 4 (pphr) | Premix Ex. 5 (pphr) | Premix Ex. 6 (pphr) |
|---|---|---|---|---|---|---|---|
| PAROIL 140 | B | 0 | 0 | 0 | 0 | 0 | 0 |
| Ultramarine Blue-16 | B | 0 | 0 | 0 | 0 | 0 | 0 |
| ATOMITE | B | 106 | 106 | 106 | 106 | 0 | 112.3 |
| $TiO_2$ | B | 110 | 110 | 110 | 110 | 110 | 20.6 |
| Hi-Sil 233 | B | 0 | 0 | 0 | 0 | 0 | 0 |
| TALC MIST SUP FROST | C | 0 | 0 | 0 | 0 | 0 | 0 |
| GLASS BEADS | C | 329 | 251 | 251 | 329 | 251 | 261.8 |
| YELLOW YT 808D | B | 0 | 0 | 0 | 0 | 0 | 11.2 |
| YELLOW YT 800D | B | 0 | 0 | 0 | 0 | 0 | 33.1 |

The mixtures were subsequently calendered to form a sheet 1.4 mm thick, as generally described in U.S. Pat. No. 4,490,432, and cooled to room temperature.

Comparative Examples A, B, and C depict compositions comprising reinforcing materials, such as, polyester fibers, polyethylene sheets and ceramic fibers. Examples 1-6 are essentially free of reinforcing materials. Density and glass transition temperature (Tg) for Comparative Examples A-C, and Examples 1-6 were measured as described above and are reported in Table 3.

TABLE 3

Density and Tg of Comparative Examples A-C, and Examples 1-6.

| Examples | Density (g/cm³) | Tg (° C.) |
|---|---|---|
| Comparative Example A | 1.92 | −3.40 |
| Comparative Example B | 1.92 | −3.40 |
| Comparative Example C | 1.79 | −3.3 |
| Example 1 | 1.96 | −19.30 |
| Example 2 | 1.95 | −12.60 |
| Example 3 | 1.96 | −13.4 |
| Example 4 | 2.0 | −12.6 |
| Example 5 | 2.0 | −12.6 |
| Example 6 | 1.83 | −10.2 |

Tensile strength at break, tensile yield strength, and secant modulus at 10% strain rate of Comparative Examples A-C and Examples 1-6 were measured in the crossweb direction as described above. Results are reported in Table 4.

TABLE 4

Mechanical Properties of Comparative Examples A-C and Examples 1-6 in the Crossweb Direction

| Example | Tensile strength at break (kg/cm²) | | | Tensile yield stress (kg/cm²) | | | Secant modulus at 10% (kg/cm²) | | |
|---|---|---|---|---|---|---|---|---|---|
| | 0° C. | 25° C. | 70° C. | 0° C. | 25° C. | 70° C. | 0° C. | 25° C. | 70° C. |
| Comp. Example A | 44 | 7 | 3 | 43 | 7 | 1 | 413 | 62 | 23 |
| Comp. Example B | 50 | 10 | 3 | 50 | 10 | 2 | 189 | 204 | 19 |
| Comp. Example C | n.m.* | 12 | 3 | n.m.* | 17 | 3 | n.m.* | 106 | 26 |
| Example 1 | 36 | 16 | 5 | 36 | 16 | 4 | 361 | 155 | 48 |
| Example 2 | 40 | 19 | 6 | 40 | 19 | 5 | 347 | 166 | 45 |
| Example 3 | 33 | 18 | 4 | 33 | 18 | 4 | 282 | 147 | 31 |
| Example 4 | 41 | 21 | 5 | 40 | 21 | 5 | 376 | 180 | 46 |
| Example 5 | 39 | 18 | 5 | 39 | 18 | 5 | 385 | 183 | 49 |
| Example 6 | n.m.* | 17 | 5 | n.m.* | 18 | 5 | n.m.* | 160 | 46 | n.m.*: not measured

TABLE 5

Mechanical Properties of Comparative Examples A-C and Examples 1-6 in the Downweb Direction at 25° C.

| Example | Tensile strength at break (kg/cm2) | Tensile yield stress (kg/cm2) | Secant modulus at 10% (kg/cm2) |
|---|---|---|---|
| Comp. Example A | 52 | 52 | 574 |
| Comp. Example B | 16 | 16 | 316 |
| Comp. Example C | 65 | 63 | 349 |
| Example 1 | 13 | 13 | 131 |
| Example 2 | 24 | 23 | 178 |
| Example 3 | 18 | 17 | 138 |
| Example 4 | 24 | 24 | 191 |
| Example 5 | 19 | 18 | 184 |
| Example 6 | 16 | 16 | 149 |

Tensile strength at break was measured in the downweb direction at a temperature of 25° C. The ratio of the tensile strength at break in the downweb and crossweb directions was calculated and is reported in Table 6.

TABLE 6

Tensile Strength at Break Ratio and Secant Modulus Ratio for Comparative Examples A and B and Examples 1-5.

| Examples | Tensile strength at break ratio downweb/crossweb (%) | Secant modulus at 10% ratio downweb/crossweb (%) |
|---|---|---|
| Comp. Ex. A | 784 | 930 |
| Comp. Ex. B | 168 | 155 |
| Comp. Ex. C | 546 | 329 |
| Example 1 | 84 | 84 |
| Example 2 | 121 | 107 |
| Example 3 | 99 | 94 |
| Example 4 | 118 | 106 |
| Example 5 | 104 | 100 |
| Example 6 | 95 | 93 |

Comparative Examples A and B have greater tensile strength in the downweb direction than in the crossweb direction. Examples 1-5 have comparable strength in both directions. Without wishing to be bound by theories, it is believed that high tensile strength in the crossweb direction of patterned pavement marking tapes may lead to increased resistance to flattening. In at least some instances, maintenance of the pattern is important in order to maintain the optical properties (e.g., reflectivity) of the pavement marking tape.

The Cap-Y and chromaticity of Comparative Example C and Example 6 were measured both before and after accelerated weathering. The following Table 7 summarizes the results.

TABLE 7

CAP-Y and Chromaticity of Comparative Example C and Example 6.

| | | Cap Y | Small X | Small Y |
|---|---|---|---|---|
| Comparative Example C | Initial | 50.33 | .4973 | .4509 |
| | 1000 hrs Weathering | 67.16 | .3451 | .3470 |
| Example 6 | Initial | 54.01 | .4907 | .4448 |
| | After Weathering | 50.60 | .4806 | .4344 |

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A pavement marking composition, comprising:
   a non-crosslinked elastomeric material;
   a thermoplastic reinforcing polymer;
   wherein the pavement marking composition lacks a reinforcing material other than the thermoplastic reinforcing polymer.

2. The pavement marking composition of claim 1, wherein the non-crosslinked elastomeric material comprises acrylonitrile-butadiene and the pavement marking composition has a Tg that is less than −10° C.

3. The pavement marking composition of claim 1, further comprising a PVC resin.

4. The pavement marking composition of claim 1, wherein the non-crosslinked elastomeric material comprises acrylonitrile-butadiene and the pavement marking composition has a downweb/crossweb tensile strength ratio that is less than 150 percent at 25° C.

5. The pavement marking composition of claim 1, wherein the non-crosslinked elastomeric material comprises acrylonitrile-butadiene and the pavement marking composition has a downweb/crossweb 10% secant modulus ratio less than 150 percent.

6. The pavement marking composition of claim 1, wherein the non-crosslinked elastomeric material comprises acrylonitrile-butadiene and the pavement marking composition has a crossweb tensile strength that is greater than 3.5 cm$^2$ at 70° C.

7. The pavement marking composition of claim 1, wherein the non-crosslinked elastomeric material comprises acrylonitrile-butadiene and the pavement marking composition comprises a crossweb tensile strength that is less than 50 kg/cm' at 0° C.

8. The pavement marking composition of claim 1, further comprising an extender resin.

9. The pavement marking composition of claim 1, further comprising a pigment.

10. The pavement marking composition of claim 1, further comprising reflective elements.

11. The pavement marking composition of claim 1, comprising:
   5 to 25% wt. non-crosslinked elastomeric material;
   1 to 25% wt. thermoplastic reinforcing polymer; and
   up to 75% wt. reflective elements.

12. The pavement marking of claim 1 consisting essentially of:
   one or more non-crosslinked elastomeric material;
   one or more thermoplastic reinforcing polymers;
   one or more extender resins;
   one or more pigments;
   one or more reflective elements.

* * * * *

UNITED STATES PATENT AND TRADEMARK OFFICE
CERTIFICATE OF CORRECTION

| | |
|---|---|
| PATENT NO. | : 10,753,053 B2 |
| APPLICATION NO. | : 13/990292 |
| DATED | : August 25, 2020 |
| INVENTOR(S) | : Hedblom |

It is certified that error appears in the above-identified patent and that said Letters Patent is hereby corrected as shown below:

In the Claims

Column 12, Line 34, in Claim 7, delete "50 kg/cm" and insert -- 50 kg/cm$^2$ --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*